(12) United States Patent
Corradino et al.

(10) Patent No.: US 10,779,220 B2
(45) Date of Patent: Sep. 15, 2020

(54) METHOD AND CHIP FOR DETECTING A CORRUPTION OF AT LEAST ONE CONFIGURATION PARAMETER

(71) Applicant: THALES DIS FRANCE SA, Meudon (FR)

(72) Inventors: David Corradino, Gemenos (FR); Philippe Tivolle, Gemenos (FR); Stéphane Quetglas, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 63 days.

(21) Appl. No.: 15/562,023

(22) PCT Filed: Mar. 30, 2016

(86) PCT No.: PCT/EP2016/056866
§ 371 (c)(1),
(2) Date: Sep. 27, 2017

(87) PCT Pub. No.: WO2016/156357
PCT Pub. Date: Oct. 6, 2016

(65) Prior Publication Data
US 2018/0249397 A1     Aug. 30, 2018

(30) Foreign Application Priority Data
Mar. 31, 2015   (EP) .................................... 15305469

(51) Int. Cl.
*H04W 48/02* (2009.01)
*H04W 24/02* (2009.01)
(Continued)

(52) U.S. Cl.
CPC ............. *H04W 48/02* (2013.01); *H04W 8/18* (2013.01); *H04W 24/02* (2013.01); *H04W 48/16* (2013.01); *H04W 88/16* (2013.01); *H04W 4/60* (2018.02)

(58) Field of Classification Search
None
See application file for complete search history.

(56) References Cited

U.S. PATENT DOCUMENTS

2007/0239857 A1 * 10/2007 Mahalal ................ H04L 63/083
709/219
2009/0219823 A1 * 9/2009 Qian ................... H04L 41/0631
370/250
(Continued)

FOREIGN PATENT DOCUMENTS

| GB | 2 491 392 A | 12/2012 | |
| WO | WO 2005/009064 A1 | 1/2005 | |
| WO | WO-2013152544 A1 * | 10/2013 | .............. H04W 8/00 |

OTHER PUBLICATIONS

International Search Report (PCT/ISA/210) dated May 13, 2016, by the European Patent Office as the International Searching Authority for International Application No. PCT/EP2016/056866.
(Continued)

*Primary Examiner* — Huy D Vu
*Assistant Examiner* — Bao G Nguyen
(74) *Attorney, Agent, or Firm* — Buchanan Ingersoll & Rooney PC

(57) ABSTRACT

A chip is coupled to a device. The device stores at least one configuration parameter for configuring an access to an Internet type network. According to the invention, the chip stores data relating to at least two subscriptions. The method comprises the following steps. The chip de-activates a first subscription. The chip activates a second subscription. The second subscription is distinct from the first subscription, as (Continued)

a previously active subscription. The second subscription is a currently active subscription. The chip detects whether the device does or does not read a currently active subscription. Only if the device reads a currently active subscription, then the chip detects whether at least one configuration parameter does or does not allow accessing an Internet type network. Only if at least one configuration parameter does not allow accessing an Internet type network, then the chip ascertains that at least one configuration parameter is corrupted.

10 Claims, 1 Drawing Sheet

(51) Int. Cl.
*H04W 8/18* (2009.01)
*H04W 48/16* (2009.01)
*H04W 88/16* (2009.01)
*H04W 4/60* (2018.01)

(56) References Cited

U.S. PATENT DOCUMENTS

| 2010/0279733 | A1* | 11/2010 | Karsten | H04W 48/18 455/552.1 |
| 2012/0289151 | A1* | 11/2012 | Wu | H04W 60/00 455/39 |
| 2014/0220971 | A1* | 8/2014 | Jacobs | H04W 8/183 455/435.1 |
| 2018/0249397 | A1* | 8/2018 | Corradino | H04W 24/02 |

OTHER PUBLICATIONS

Written Opinion (PCT/ISA/237) dated May 13, 2016, by the European Patent Office as the International Searching Authority for International Application No. PCT/EP2016/056866.

European Search Report dated Sep. 8, 2015, by the European Patent Office for Application No. 15305469.7.

NEC: "Batch 2: Addition of ESM TC 10.5.3 for UE requested PDN connectivity not accepted", 3GPP TSG RAN WG5 Meeting #42, Athens, Greece, Feb. 9-13, 2009 (4 pages).

* cited by examiner

METHOD AND CHIP FOR DETECTING A CORRUPTION OF AT LEAST ONE CONFIGURATION PARAMETER

FIELD OF THE INVENTION

The invention relates generally to a method for accessing an Internet type network.

Furthermore, the invention also pertains to a chip for accessing an Internet type network.

The present invention is notably applicable to a mobile radio-communication field wherein a chip may be either embedded, such as an embedded Universal Integrated Circuit Card (or eUICC) within a device, as a chip host device, or removable from the device, as a chip included within a smart card termed Subscriber Identity Module (or SIM) type card or the like, as a Secure Element (or SE).

Within the present description, an SE is a smart object that includes a chip that protects access to stored data and is intended to communicate data with an SE host device, like e.g. a mobile (tele)phone.

STATE OF THE ART

As known per se, a mobile phone is configured with an Access Point Name (or APN), as a configuration parameter, which the phone stores. The APN is associated with a Mobile Network Operator (or MNO) or Mobile Virtual Network Operator (or MVNO)) relating to a home network. The APN is used by the phone to open a Packet Data Protocol (or PDP) context. Once the PDP context, as a tunnel to an Internet network, is opened, the phone accesses, through a connected mobile radio-communication network, Internet.

However, when the phone is roaming from a home to a foreign network and switches from an International Mobile Subscriber Identity (or IMSI) to another, the phone may replace the home network APN by a foreign network APN or erase it, i.e. corrupt the home network APN. Such an home network APN corruption does not allow a phone user to access, from the phone, through a connected mobile radio-communication network, to Internet.

Thus, there is a need to provide a solution that allows detecting, in an efficient, quick and simple way, a configuration parameter corruption.

SUMMARY OF THE INVENTION

The invention proposes a solution for satisfying the just herein above specified need by providing a method for detecting a corruption of at least one configuration parameter.

According to the invention, a chip is coupled to a device. The chip stores data relating to at least two subscriptions. The device stores at least one configuration parameter for configuring an access to an Internet type network. The method comprises the following steps. The chip detects whether the device does or does not read a currently active subscription. Only if the device reads a currently active subscription, then the chip detects whether at least one configuration parameter does or does not allow accessing an Internet type network. Only if at least one configuration parameter does not allow accessing an Internet type network, then the chip ascertains that at least one configuration parameter is corrupted.

The principle of the invention consists in that a chip which cooperates with a device determines, firstly, that the chip sends a currently active subscription identifier, like e.g. an IMSI, and, if yes, secondly, whether one or several configuration parameters stored within the device do or do not allow opening a channel to an Internet type network. If not, the chip knows that the configuration parameter(s) is(are) wrong, i.e. corrupted.

It is to be noted that the invention (configuration) parameter corruption detection is valid when the (right) configuration parameter has been modified and also when the configuration parameter has been deleted or erased.

A triggering of the detection of a corruption of a configuration parameter(s) resident in the device is a subscription identifier providing. The subscription identifier providing is present notably when the device is powered on or when the chip switches from a first to a second subscription, as a currently active subscription.

The invention method is automatically implemented.

Thus, a subscriber, as a user of the chip that implements the invention method, is not involved to detect that the configuration parameter(s) is(are) not the right one(s).

The invention method is therefore convenient for the subscriber.

The invention method allows determining, in an efficient, quick and simple manner, a corrupted status of the configuration parameter(s).

It is to be noted that the currently active subscription which is used relates to either a home MNO (or MVNO) or a non-home MNO (or MVNO) and may be distinct from a subscription which is associated with the right configuration parameter(s) to be used to access the Internet type network.

The right configuration parameter(s) to be used may be related to either a home MNO (or MVNO) or a non-home MNO (or MVNO), like e.g. a foreign MNO (or MVNO).

The invention method allows determining either statically, i.e. when present in a place accessible from a home or a foreign mobile network during a boot of the chip, or dynamically, i.e. when switching from a first to a second subscription. The second subscription is accessible, through an MNO or an MVNO, as a second operator that may have a roaming agreement with an operator, as a first operator, that manages the first subscription of origin.

Once the chip has detected a configuration parameter corruption, the chip lets re-configure (or re-configures) preferably the device by using right configuration parameter(s) loaded from a server (or the chip).

Thus, a device re-configuration operation with the right configuration parameter may be launched immediately and automatically after an invention parameter corruption detection.

The proposed invention solution allows being able to quickly enhance the user experience and is thus convenient for the device user who benefits, after a device (re-) configuration operation, from an access to the Internet and its related services.

According to a further aspect, the invention is a chip for detecting a corruption of at least one configuration parameter.

According to the invention, the chip is likely to be coupled to a device. The chip comprises means for storing data relating to at least two subscriptions. The device comprising means for storing at least one configuration parameter for configuring an access to an Internet type network. The chip is configured to detect whether the device does or does not read a currently active subscription. The chip is configured to detect, only if the device reads a currently active subscription, whether at least one configuration parameter does or does not allow accessing an Internet type network. The chip is configured to ascertain, only if at least one configuration parameter does not allow accessing an Internet type network, that at least one configuration parameter is corrupted.

The chip may be fixed to or removable from the device.

The chip is preferably included within an SE.

The invention does not impose any constraint as to a kind of the SE type.

As a removable SE, it may be a SIM type card, a Secure Removable Module (or SRM), a smart dongle of the USB (acronym for "Universal Serial Bus") type, a (micro-) Secure Digital (or SD) type card or a Multi-Media type Card (or MMC) or any format card to be coupled or connected to a host device, as a device.

As to the chip host device, it may be constituted by any electronic device comprising data processing means, data storing means and one or several Input/Output (or I/O) communication interfaces, like e.g. a user terminal or a terminal.

BRIEF DESCRIPTION OF THE DRAWINGS

Additional features and advantages of the invention will be more clearly understandable after reading a detailed description of one preferred embodiment of the invention, given as one indicative and non-limitative example, in conjunction with the following drawings.

DETAILED DESCRIPTION

Herein under is considered an embodiment in which the invention method for detecting a corruption of a configuration parameter(s) is implemented notably by a chip, as an SE incorporated within a terminal, like e.g. an eUICC, as a chip soldered, possibly in a removable manner, on a Printed Circuit Board (or PCB) of the terminal.

The chip may also incorporate at least part of the host terminal component(s), like e.g. a baseband processor, an application processor and/or other electronic component(s).

Alternately, instead of an eUICC, the chip may be a Trusted Execution Environment (or TEE), as a secure area of a terminal processor and a secured runtime environment.

The SE may nevertheless have different form factors.

Instead of being embedded within its host device, the chip may be carried by a medium, such as a smart card or a dongle, like e.g. a USB type dongle.

Naturally, the herein below described embodiment is only for exemplifying purposes and is not considered to reduce the scope of the invention.

Figure 1:
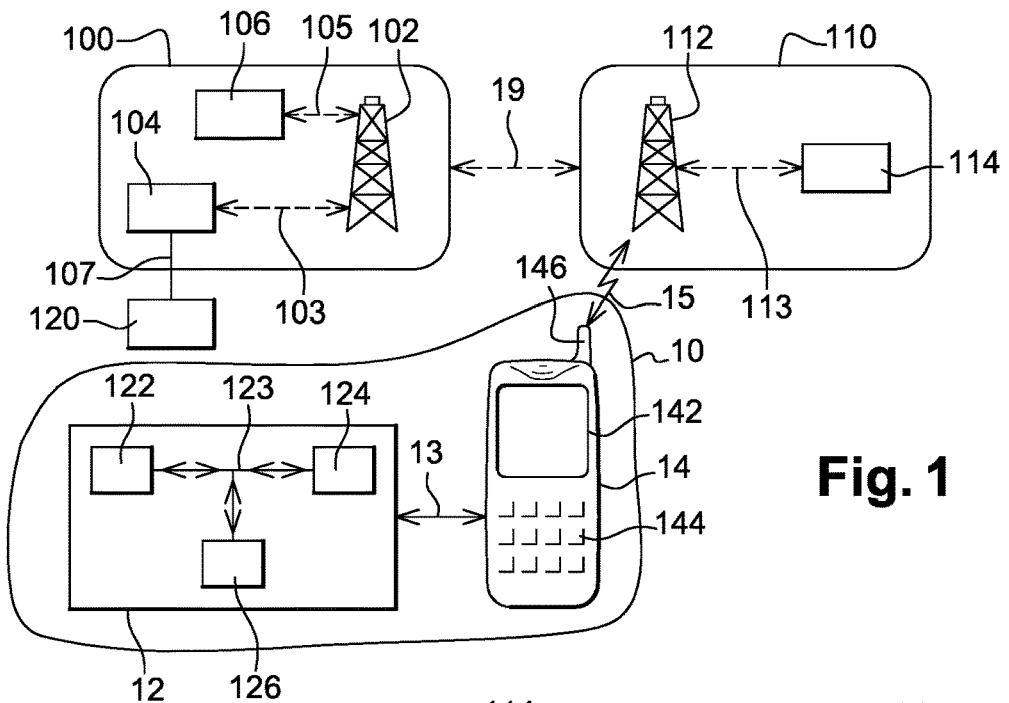
FIG. 1 is a simplified diagram of a home and a non-home (mobile) network, a terminal equipment and an Internet network, the terminal equipment comprising a phone and a chip being arranged to detect whether the phone does or does not read from the chip a currently active subscription and, if yes, to detect whether a configuration parameter(s) resident in the phone does or does not allow accessing Internet and, if not, to find out that the configuration parameter(s) is(are) corrupted, according to the invention.

FIG. 1 shows schematically a Terminal Equipment (or TE) 10, a home mobile network 100, a foreign mobile network 110, as a non-home mobile network, and an Internet type network 120.

The TE 10 includes a chip 12 and a mobile phone 14, as a (user) terminal and a chip host device.

For sake of simplicity, the chip 12, the mobile phone 14, the home mobile network 100, the foreign mobile network 110 and the Internet type network 120 are termed infra the SE 12, the phone 14, the first network 100, the second network 110 and the Internet 120 respectively.

A TE 10 user benefits from a first subscription to access the first network 100. The first subscription is identified by IMSI1, as a first subscription identifier.

The TE 10 is under a radio coverage of the second network 110.

The (user) terminal, the terminal or a machine in a Machine to Machine (or M2M) context as a terminal may be either fixed (i.e. not mobile) or mobile. The (user) terminal may be a Personal Digital Assistant (or PDA), a vehicle, a set-top box, a tablet computer, a desktop computer, a laptop computer, a video player, an audio player, a portable Tele-Vision (or TV), a media-player, a game console, a netbook, an electronic mobile equipment or accessory (e.g.: glasses, a watch or a jewel)

Instead of a phone, the user terminal or the terminal may be any other computer device including means for processing data, comprising (or being connected to) wireless communication means for exchanging data with outside, and comprising (or being connected to) means for storing data.

Within the present description, the adjective "wireless" used within the expression "wireless communication means" denotes notably that the communication means communicates via one or several Long Range (or LR) Radio-Frequency (or RF) links.

The LR RF may be fixed at several hundreds of MHz, for instance, around 850, 900, 1800, 1900 and/or 2100 MHz.

The phone 14 is preferably used for accessing two (or more) mobile radio-communication networks, namely at least the first 100 and the second 110 network.

The mobile radio-communication networks, as cellular communication networks, may be constituted by a Global System for Mobile Communications (or GSM), a General Packet Radio Service (or GPRS), a Universal Mobile Telecommunications System (or UMTS), an EDGE (acronym for "Enhanced Data Rates for GSM Evolution"), a Code Division Multiple Access (or CDMA) and/or a Long Term Evolution (or LTE) type network(s).

Such a cellular communication network set is not exhaustive but only for exemplifying purposes.

The phone 14 is connected, through a bi-directional link 13, to the SE 12.

The SE 12 is under control of a phone 14 (micro) processor (not represented).

The SE 12 is preferably associated with or tied to a first network authentication server (not represented). The first network authentication server is included within (or connected to) the first network 100.

The SE 12 belongs to a user, as a subscriber to a wireless service(s).

The SE 12 includes a (micro)processor(s) 122, as data processing means, a memory(ies) 124, as data storing means, and one or several I/O interfaces 126 that are internally all connected, through an internal bidirectional data bus 123, to each other.

The I/O interface(s) 126 allow(s) communicating data from the internal SE 12 components to the chip exterior and conversely.

The memory 124 stores an Operating System (or OS).

The memory 124 stores preferably one or several SIM type applications.

The SIM type application(s) includes, among others, a SIM application for a GSM type network, a Universal Subscriber Identity Module (or USIM) application for a UMTS type network, a CDMA Subscriber Identity Module (or CSIM) application and/or an Internet protocol Multimedia Subsystem (or IMS) SIM (or ISIM) application.

The SIM type application(s) allow(s) the phone 14 to identify and authenticate to at least one mobile network, like e.g. the first 100 and the second 110 network.

The memory 124 stores, preferably in a secure manner, preferably a plurality of sets of data relating, each, to a subscription, as a wireless service(s). Among the subscription data set plurality, there are a first subscription data set relating to the first network 100 and at least one second subscription data set relating to the second network 110.

The first subscription data set, as "IMSI1", relates to the first operator MNO1.

The second subscription data set, as "IMSI2", relates to the second operator MNO2 that is preferably distinct from the first operator MNO1.

Several subscription data sets relating to two (or more) corresponding MNOs and/or MVNOs and corresponding first 100 and second 110 networks are thus available, at the client side, within the SE 12.

Each set of data relating to one subscription includes:
an IMSI, as a subscriber and a (service) subscription identifier for accessing a mobile network;
a key Ki, as a network authentication key, allowing to authenticate the concerned subscriber to the concerned mobile network;
Milenage (or the like), as a network authentication algorithm, allowing to authenticate the concerned subscriber to the concerned mobile network;
a file system including one or several Elementary Files (or EF);
one or several security keys, like e.g. a key(s) for encrypting/decrypting data and/or a key(s) for signing data a key(s), as secret data; and/or
one or several credentials, like e.g. a user name and/or an IDentifier (or ID) of the subscriber, as data relating to the user.

The first subscription data set comprises an identifier IMSI1 relating to the first subscription.

The first subscription data set IMSI1 allows identifying the subscriber to the first network 100.

The first subscription data set IMSI1 is active, i.e. is in an enabled state, before a subscription switch, and is inactive after the subscription switch at the SE 12 side.

The first subscription data set IMSI1 includes preferably a first key Ki1, as a first network authentication key, for authenticating the subscriber to the first network 100. The first key Ki1 is associated with the subscriber. The first key Ki1 allows authenticating the subscriber to the first network authentication server.

The second subscription data set IMSI2 allows identifying the subscriber to a second network 110.

In a subscription switch scenario, the second subscription data set IMSI2 is inactive, i.e. is in a disabled state, before a subscription switch and is active after the subscription switch at the SE 12 side.

The second subscription data set IMSI2 includes preferably a second key Ki2, as a second network authentication key, for authenticating the subscriber to the second network 110.

The second key Ki2 allows authenticating the subscriber to the second network authentication server.

Alternately, instead of being distinct from the first key Ki1, the second key Ki2 matches the first key Ki1.

The memory 124 may store data relating to a Uniform Resource Identifier (or URI), a Uniform Resource Locator (or URL) and/or an Internet Protocol (or IP) address of an external entity to be addressed, like e.g. a server accessible within or through the Internet 120.

The processor 122 processes, controls and communicates internally data with all the other components incorporated within the SE 12 and, through the I/O interface(s) 126, with the chip exterior.

The processor 122 executes or runs one or several applications, like e.g. a subscription switch application.

The SE 12, and more exactly the subscription switch application, is preferably able to switch from the first to a second subscription. To do such a subscription switch, the SE 12 de-activates the first subscription, as a currently active subscription, and activates the second subscription, as a currently non-active subscription to be activated.

The processor 122 executes, in a preferred manner, one or several security functions.

The security functions include preferably a user authentication process to be used prior to continuing to access the SE 12, notably at a boot, i.e. a power on, of the SE 12. To authenticate the user, the user has to provide a Personal Identity Number (or PIN) or biometric data, as user reference data, that is stored, preferably in a secure manner, within the memory 124. As biometric data, it may include one or several fingerprints, one or several iris prints, one or several voiceprints relating to one or several authorized users.

The processor 122 is preferably able to initiate an action(s), in order to interact directly with the outside world, in an independent manner of the phone 14. Such a capacity of interaction at the initiative of the SE 12 is also known as being a proactive capacity in which the SE 12 plays a role of a master while the SE host device plays a role of a slave. According to one preferred embodiment, the SE 12 is able to use SIM ToolKit (or STK) type commands, as proactive commands.

The SE 12 is thus able to send, at its own initiative, either through the phone 14 (to any device, like e.g. a server, connected to the phone 14) or to the phone 14, a message by using a proactive command, like e.g. a "OPEN CHANNEL related to Default (network) Bearer", for establishing a connection, like e.g. create a PDP context, by using a (current) configuration parameter(s), like e.g. an APN for GPRS, that is(are) provided by the SE host device.

The "OPEN CHANNEL related to Default (network) Bearer" command is compliant with notably the 3GPP TS 31.111 V3.14.0 (June 2007).

Among the supported applications, the memory 124 stores an invention application termed parameter corruption detector that the processor 122 executes.

The parameter corruption detector allows carrying out a detection of an issuing of the currently active subscription from the SE 12 to the SE host device and, once issued, a detection of a failure of an access (or connection) attempt to Internet 120 with a current configuration parameter(s) registered within the SE host device after an Internet access request initiated by the SE 12. The Internet access failure may be a terminal response type command and/or an error status type word. The parameter corruption detector allows ensuring that the configuration parameter(s) that is(are) currently stored or absent at the SE host device is(are) not the right one(s), i.e. is(are) corrupted.

To detect such a configuration parameter corruption, the parameter corruption detector firstly surveys the SE 12 activity. The parameter corruption detector analyses whether the SE 12 does or does not send to the phone 14 the currently active subscription. As soon as the SE 12 sends the currently active subscription, the SE 12 detects whether a parameter(s) stored within the phone 14 do(es) or do(es) not allow accessing Internet 120. The configuration parameter(s) stored within a phone 14 memory (not represented) allows configuring an access to the Internet 120.

To detect such a capability for accessing Internet with the configuration parameter(s), the parameter corruption detector requests preferably to the phone 14 to access from the phone 14 to Internet 120 by using a particular command that forces the phone 14 to use the configuration parameter(s) that the phone 14 stores and analyses whether the SE 12 does or does not receive from the phone 14 a corresponding access failure. If the SE 12 receives from the phone 14 an access failure relating to a requested access, then the corruption detector has found out a presence of a corrupted configuration parameter(s), i.e. an absence of any stored configuration parameter(s) or an erroneous configuration parameter(s).

Once the configuration parameter(s) is(are) detected as non-right, the SE 12 is preferably able to let the phone 14 recover the right configuration parameter(s) relating to the considered phone 14 and that allow(s) accessing, through one (or several) connected network(s), the Internet 120.

The SE 12, as a chip embedded within the phone 14, is coupled or connected to the phone 14, as a SE host device.

Alternately, the phone 14 comprises the chip 12 that is removable from the phone 14.

The phone I/O interfaces include one or several I/O interfaces for exchanging data with the chip 12.

The phone I/O interface with the chip 12 may be an International Organization for Standardization (or ISO) 7816 interface, as a contact interface, when the chip 12 is inserted, in a removable manner, within the phone 14.

Alternately, instead of a contact interface, the phone I/O interface with the chip 12 is connected to or includes a contact-less interface. The phone 14 is connected to or includes means for communicating data while using preferably a Short Range (or SR) RF link. The SR RF link may be related to any technology that allows the phone 14 to exchange data, through a so-termed contact-less link with the chip 12. The SR RF may be fixed at 13.56 MHz and related to a Near Field Communication (or NFC) type technology, as a contact-less technology.

The phone 14 includes data processing means, such as one (micro)processor (not represented), data storing means (not represented), as a phone memory, and one or several I/O interfaces that are linked all together through a control and data bus (not represented).

The phone 14 plays, in a preferential manner, a role of a modulator-demodulator (or modem), so as to exchange data in a wireless manner.

The phone 14 carries out the following operations:

a modulation of an analogical carrier signal to encode digital information to be transmitted, over the antenna 146, to one (or several) network(s) 100 and/or 110, and a demodulation of a received analogical carrier signal to decode the encoded digital information that is received, over the antenna 146, from one (or several) network(s) 100 and/or 110.

The phone memory may comprise one or several memories including one or several volatile memories and one or several non-volatile memories.

In a subscription switch scenario, a phone memory, be it either volatile or non volatile, stores, at least in a temporary manner, data relating to a currently active subscription, namely the first subscription and, after a subscription switch, the second subscription, which the phone 14 receives from the SE 12.

The phone memory may be constituted by one or several EEPROMs (acronym for "Electrically Erasable Programmable Read-Only Memory"), one or several ROMs (acronym for "Read Only Memory"), one or several Flash memories, and/or any other memories of different types, like one or several RAMs (acronym for "Random Access Memory").

The phone memory stores e.g an International Mobile Equipment Identity (or IMEI) and/or an email address, as an identifier(s) relating to the phone 14.

The phone memory stores, at least in a temporary manner, an APN and/or other data, as a configuration parameter(s), that allow(s) configuring an access, through a connected mobile network(s), to the Internet 120, as a computer network.

The APN is the name of a gateway between a mobile network and a computer network, like e.g. the Internet 120.

An APN structure comprises an identifier of a network, like e.g. network id., which the gateway is connected to. Optionally, the APN structure may comprise the service, like e.g., a Wireless Application Protocol (or WAP) server or a Multimedia Messaging Service (or MMS).

The APN structure may comprise an identifier of an MNO, like e.g., mnc<MNC>.mcc<MCC>.gprs, in which mnc is a Mobile Network Code and mcc is Mobile Country Code which together identify uniquely the MNO.

The APN, as a configuration parameter, may be either absent, further to e.g., a previous erasure, or present, while being not right within the phone memory, and therefore corrupted. When corrupted, the configuration parameter(s) stored within the chip host device memory do(es) not allow accessing, through a connected mobile network(s), the Internet 120.

The APN is used by a terminal device, like e.g., the phone 14, to open a PDP context, through at least one gateway, as described infra in more details.

The phone memory stores an OS and one or several applications.

The phone 14 includes preferably a display screen 142 and a keyboard 144, as Man Machine Interface (or MMI).

Alternatively, instead of a physical keyboard separated from the display screen, the phone 14 is equipped with a touch sensitive display screen, as a virtual keyboard.

The MMI allows a phone user to interact with the phone 14.

The phone 14 comprises an antenna 146. The antenna 146 allows communicating data, Over-The-Air (or OTA), through an LR RF link 15, with a mobile network(s), like e.g. the first 100 and/or the second 110 network.

The first network 100 is operated by at least one first (mobile network) operator, like e.g. a MNO and/or a MVNO, as an MNO1.

The first network 100 is related to a home country.

The first network 100 includes a first base station 102 (or the like) that is used for communicating with an RF enabled device, like e.g. the phone 14.

The first network 100 includes a first GateWay (or GW) 104, as a home GW.

The first GW 104 may be a Gateway GPRS Support Node (or GGSN) in a second Generation (or 2G) and a third Generation (or 3G) type network, a Mobility Management Entity (or MME) in a fourth Generation (or 4G) type network or any other network entity connected to the Internet 120.

The first GW 104 is connected, indirectly through internal network links 103, to the first base station 102.

The first GW 104 is connected, through a wire link 107, to the Internet 120.

The first base station 102 is connected, indirectly through network links 105, to a server 106.

The server 106 is hosted by a computer with data processing means and data storing means.

The server 106 allows getting a right APN, as a configuration parameter for configuring a connection from the phone 14 to the Internet 120.

Alternatively, instead of an APN, the configuration parameter is other particular data.

Alternately, instead of a single configuration parameter, there is a plurality of configuration parameters.

The server 106 accesses a database stored in a memory (not represented) that is present within or connected to the server 106.

The database includes a correspondence table that includes, for at least one identifier, like e.g. an IMEI, of a chip host device, an associated configuration parameter(s), like e.g. an APN, to be used by the concerned chip host device, in order to access Internet 120.

The associated configuration parameter(s) depend(s) on at least the chip host device.

For instance, the correspondence table is as follows:

| Chip host device | Configuration parameter(s) to be used for accessing Internet |
|---|---|
| IMEI1 | APN1 (or APN2 or other APNx) |
| IMEIx | APN1 (or APN2 or other APNx) |
| IMEIn | APN1 (or APN2 or other APNx) |

If the (right) configuration parameter, like e.g. APN1, to be injected into the SE host device is related to the first (and home) network 100. Thus, if the TE 10 is not under a radio-coverage of the home network 100, then the TE 10, once (re-)configured, gets access, through a gateway 114 relating to a non-home network 110 and a gateway 104 relating to a home network 100, Internet 120. And if the TE 10 is under a radio-coverage of the home network 100, then the TE 10, once (re-)configured, gets access, through a gateway 104 relating to a home network 100, Internet 120.

If the (right) configuration parameter, like e.g. APN2, to be injected into the SE host device is related to the second (and non-home) network 110. Thus, if the TE 10 is under a radio-coverage of the second network 100, then the TE 10, once (re-) configured, gets access, through the gateway 114 relating to the second network 110, Internet 120. And if the TE 10 is under a radio-coverage of the first network 100, then the TE 10, once (re-)configured, gets access, through the gateway 104 relating to the first network 100 and the gateway 114 relating to the second network 110, Internet 120.

The server 106 is able to send, to restore a corresponding right configuration parameter(s) to be stored within a chip host device, like e.g. the phone 14, and to launch preferably a generation of an Internet connection establishment request and a sending of the Internet connection establishment request by using the just stored (right) configuration parameter(s).

The server 106 is thus able to provide a requesting device, like e.g. the SE 12, that identifies at least its host device by using an identifier(s), like e.g. an IMEI and an input(s), so as to get a corresponding predetermined configuration parameter(s), as a corresponding output(s).

Optionally, besides an identifier of the chip host device, the corresponding predetermined configuration parameter(s) further depend(s) on a currently active subscription, like e.g. IMSI1 or IMSI2. In such a case, the correspondence table has, besides an identifier(s) relating to the chip host device, a further input, namely the currently active subscription (identifier) to be received from a requesting device, like e.g. the SE 12. Thus, for a given identified SE host device, several subscriptions may be, each, associated with a corresponding configuration parameter(s), as an output(s). Instead of or additionally to the currently active subscription identifier, the SE 12 also provides a Mobile Station International Subscriber Directory Number (or MSISDN), as a further input.

The first network 100 has its own APN denoted APN1, as a name of a gateway to Internet 120, and is specific to only the first network 100.

The second network 110 has its own APN denoted APN2, as a name of a gateway to Internet 120, and is specific to only the second network 110.

The first network 100 is connected, through a bi-directional wired link 19, to the second network 110.

The second network 110 is distinct from the first network 100.

The second network 110 may be related to the home country or one or several foreign countries.

The second network 110 includes a second base station 112 (or the like) that is used for communicating, over an RF link 15, with an RF enabled device, like e.g. the phone 14.

The second network 110, as a visited network, covers, through the second base station 112, at least in part a geographical area in which the phone 14 is situated.

The second network 110 includes a second GW 114, as a visited GW.

The second GW 114 is connected, indirectly through internal network links 113, to the second base station 112.

The second GW 114 may be a Serving GPRS Support Node (or SGSN) in a 2G type network and a 3G type network, a MME in a 4G type network or any other network entity connected to the Internet 120.

The second network 110 is operated by at least one second (mobile network) operator, like e.g. an MNO and/or an MVNO(s), as an MNO2.

The MNO2 may be either the MNO1 or distinct from the MNO1.

Figure 2:
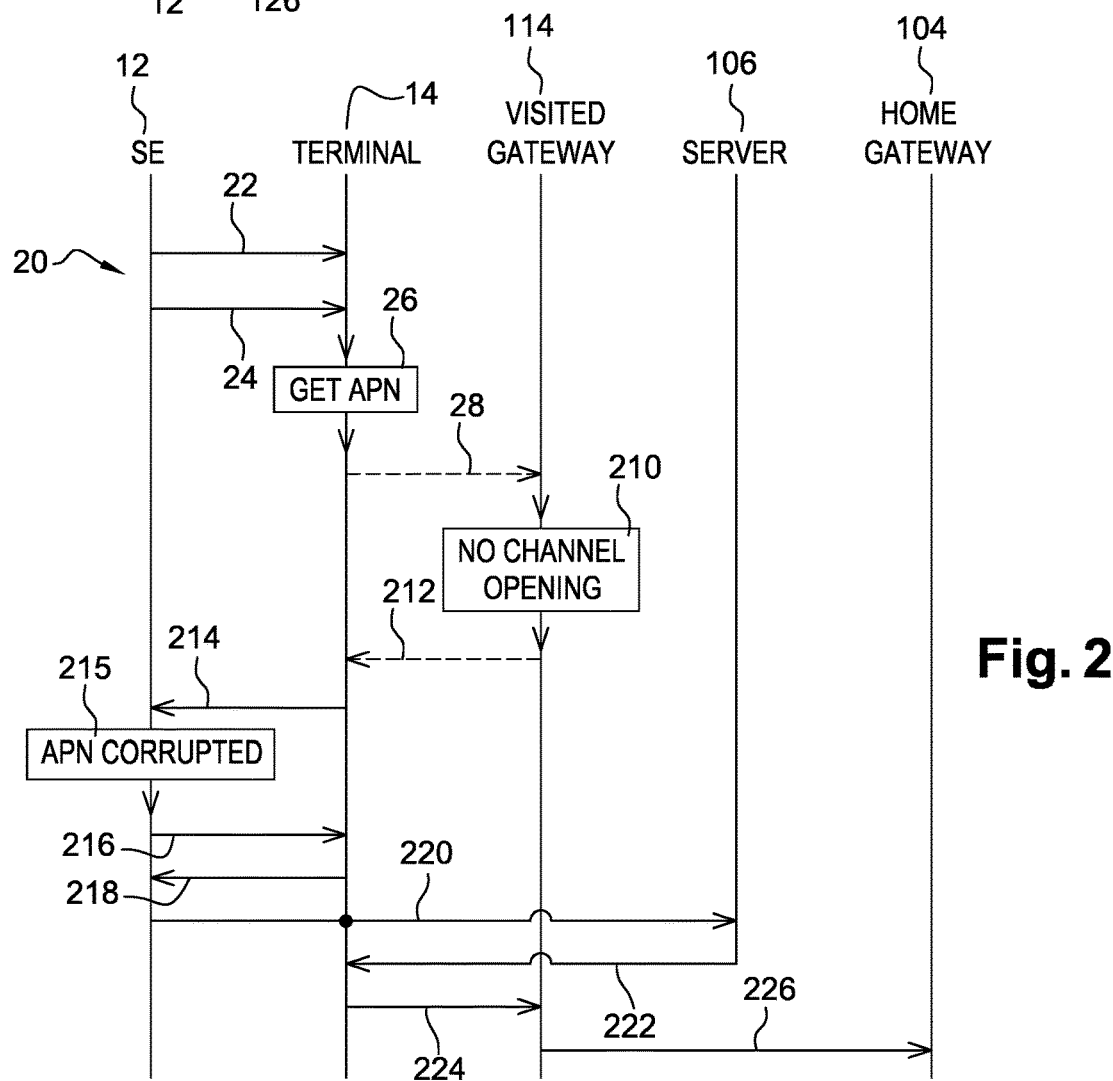
FIG. 2 illustrates an example of a flow of messages exchanged between notably the chip and the phone of FIG. 1, so that the chip detects a sending of the currently active subscription and a missing or erroneous configuration parameter(s) and controls, based on at least a phone identifier, a phone (re-)configuration, in order to correct the missing or erroneous configuration parameter(s) and to access seamlessly Internet.

FIG. 2 depicts an exemplary embodiment of a message flow 20 that involves the SE 12, the phone 14, the second GW 114, the server 106, the first GW 104 and the Internet 120.

In the explained example, it is assumed that either the first IMSI1 or the second IMSI2 is active at a given time. Additionally, i.e. besides the first IMSI1 or the second IMSI2, at least (an)other subscription(s) may be also active and the invention solution is still applicable to such a scenario.

It is further assumed that the phone 14 is roaming from a geographical place covered by the first network 100, as a home network, to another geographical place covered by the second network 110, as a visited network.

It is assumed that the phone 14 is currently under the coverage of the second 110 network.

It is assumed that an APN, namely either the APN1 relating to the first network 100 or the APN2 relating to the second network 110, constitutes a single configuration parameter to be used to access the Internet 120.

However, the invention is still applicable if there are several configuration parameters.

The phone 14 requests (not represented) from the SE a subscription switch, so as to force the SE 12 to switch to the IMSI2. The SE 12 de-activates the first subscription (data set) IMSI1 and activates the second subscription (data set) IMSI2, so as to switch to the second subscription IMSI2. Once the second subscription IMSI2 is activated, the SE 12 sends to the phone 14 a REFRESH-INIT type proactive command, as a request for reading an EF-IMSI2, as a file relating to the concerned second subscription IMSI2.

Such a file reading request allows synchronizing the phone 14 with the SE 12 with respect to the subscription data set that is currently active, namely the second subscription IMSI2 instead of the previously first subscription IMSI1.

Instead of a subscription switch scenario, the SE 12 is powered on (by using e.g. a phone 14 battery).

The SE 12 sends to the phone 14 the file relating to the concerned second IMSI2 subscription 22, as the currently active subscription.

The phone 14 (preferably after a successful first 100 or second 110 network authentication by using either Ki1 or Ki2) is connected to the second network 110.

The APN1 that is currently stored within the phone memory is either erased or replaced by the APN2, i.e. is corrupted, (not represented) through or by the phone 14. The phone 14 sends to the visited GW 114 a Signalling System Number 7 (or SS7) type message (or the like) including a request for establishing a connection to the Internet 120 and the stored APN, i.e. no data or the APN2 or an APN1 that is modified at least partially or other data, as a corrupted APN. The request for establishing a connection to the Internet 120 may be a "create PDP context" type request (not represented) accompanied with the corrupted APN. The phone 14 fails to access the Internet 120 (not represented).

As soon as the SE 12 has detected that the SE 12 has sent the currently active subscription, the SE 12 detects whether the APN that is currently stored within the phone memory does or does not allow accessing the Internet 120.

To carry out such an APN corruption detection, the SE 12 sends to the phone 14 a message 24 including a request for establishing a connection to the Internet 120 by using at least the stored APN. The message 24 may further include one or several identifiers, like e.g. a URI, a URL and/or an IP address, of a server to be addressed.

Such a message 24 includes an "OPEN CHANNEL related to Default (network) Bearer" type command.

The phone 14 gets 26 the stored APN.

If the stored APN is absent and therefore considered as corrupted due to either an erasure through or by the phone 14 or a configuration absence, then the phone 14 does not send any data.

Alternately, if the phone 14 stores some data, as the corrupted APN, instead of not sending any data, the phone 14 sends to the visited GW 114 a message 28 including a "create PDP context" type request (not represented) by using the corrupted APN. The visited GW 114 does not open 210 any channel to the Internet 120 since the used (corrupted) APN does not allow accessing the Internet 120. Then, the visited GW 114 sends to the phone 14 a message 212 including an Internet access failure or the like.

Then (further to a received Internet access failure message received from the visited GW 114 or an expiration of a predetermined time delay, like e.g. a few minutes (when the corrupted APN is no data)), the phone 14 sends to the SE 12 a message 214 including a connection establishment failure, like e.g. a terminal response type command or an error status type word. The connection establishment failure may be a connection (or link) has not been established, the PDP context is not created and/or the like.

Once the SE 12 has received the last message 214, the SE 12 ascertains that at least the (stored) APN is corrupted 215.

Such a positive APN (or configuration parameter) corruption detection allows triggering an APN restoration procedure, over a corresponding visited network, to the Internet 120.

Then, the SE 12 launches preferably a distant APN restoration procedure.

To restore remotely the (right) APN, the SE 12 sends firstly to the phone 14 a request 216, like e.g. Provide Local Information (IMEI), for getting an IMEI, as a phone identifier.

The phone 14 sends to the SE 12 a request response 218 including the IMEI.

Once the SE 12 has got the phone identifier, the SE 12 sends, through the phone 14, to the server 106 a message 220 including a request for restoring at least the APN relating to the identified phone 14 accompanied with the (retrieved) phone identifier.

It is assumed that the phone 14 exchanges with the server 106 by using e.g. a HyperText Transfer Protocol (or HTTP) and/or Short Message Service (or SMS) type message(s). However, any other data communication protocol between the phone 14 and the server 106, like e.g. a secured data communication protocol (securing in confidentiality and/or in integrity the data thus exchanged), such as a Transport Layer Security (or TLS) type protocol, may be used additionally to the HTTP and/or SMS protocol(s).

Optionally, the last message 220 includes, besides the IMEI, a subscription identifier, like e.g. the IMSI1, as a home subscription identifier, the IMSI2, as the currently active subscription, and/or other data, like e.g. a concerned MSISDN, an identifier relating to the concerned SE 12, like e.g. an Integrated Circuit Card IDentifier (or ICCID). The additional data that is sent to the server 106 may include data that is added by the SE 12, the phone 14 and/or a connected network entity, like e.g. an SMS-Centre (or SMS-C) included within the visited network 110.

The server 106 retrieves, based on the terminal (like e.g. the phone 14) identifier and possibly other received data, the right APN associated with the IMEI, like e.g. the APN1 relating to the IMSI1 (or the APN2 relating to the IMSI2 or another APN).

Once the right APN is retrieved, the server 106 sends to the phone 14 a message 222 including a request for establishing a connection to the Internet 120 along with the right APN, like e.g. the APN1 relating to the IMSI1, as the right configuration parameter(s).

Such a message 222 is used for configuring or re-configuring the phone 14 with the thus transmitted configuration parameter(s).

The content of such a message 222 may be ciphered by using e.g. predetermined subscription data, like e.g. the subscriber IMSI, so that only the SE 12 is able to de-cipher the ciphered content, so as to protect the data thus sent.

Optionally, to accept such a message 222, the phone user authenticates successfully to the SE 12 by using e.g. the PIN or other reference user data.

This last message 222 allows (re-)configuring the thus addressed phone 14 by storing the received data, namely e.g. the APN1 relating to the IMSI1, as the right APN. This last message 222 may be e.g. an SMS Open Mobile Alliance (or OMA) Client Provisioning (or CP) type message that contains the right APN.

Once the phone 14 has received the request for establishing a connection to the Internet 120 along with the received right APN, the phone 14 sends to the (connected) visited GW 114 a message 224 including a request for establishing a connection to the Internet 120 accompanied with the APN1, as the received right APN.

Then, the visited GW 114 identifies, based on the received APN1, an addressee of a connection establishment request, as a GW relating to a mobile network to be used to open a channel to the Internet 120, as a tunnel to the Internet 120.

The visited GW 114 sends to the home GW 104 a message 226 including a request for opening a channel.

The request for opening a channel may be e.g. a "PDP context open" type command.

Then, once the channel to the Internet 120 is opened, the phone 14 user may benefit, thanks to a thus established data connection through at least the connected network, from a data service(s).

The invention solution does not need to involve a phone user, except for submitting user authentication data, when applicable.

The invention solution is therefore transparent to the user, apart from a possible user authentication operation.

The invention solution is compatible with the existing network infrastructure.

Only a single server 106 is represented. However, the invention is still applicable to two (or more) servers, so as to restore the right configuration parameter(s).

The invention corruption detection method and chip allow finding a spurious configuration parameter(s) resident in the chip host device.

Then, a recovery of a right configuration parameter(s) to be injected into the device may be carried out under the chip control as soon as the configuration parameter(s) is(are) detected as being corrupted.

The right configuration parameter recovery or restoration may be on-line and secure.

Thus, the device user benefits from a good user experience.

The invention solution is compliant with the existing mobile network infrastructure.

The embodiment that has just been described is not intended to limit the scope of the concerned invention. Other embodiments may be given. As another embodiment example, instead of a scenario in which the TE 10 roams to a non-home network 110, the invention parameter corruption detection is also valid when the TE 10 roams back to a home network 100.

The invention claimed is:

1. A method for detecting a corruption of at least one configuration parameter relating to a chip host device in a roaming scenario, wherein,
a chip being embedded within or coupled to the chip host device, the chip host device storing at least one configuration parameter for configuring an access to an Internet type network,
the chip storing a first subscription and at least one second subscription, the method comprises the following steps:
de-activating, by the chip, the first subscription;
activating, by the chip, the second subscription, the second subscription being distinct from the first subscription, as a previously active subscription, the second subscription being a currently active subscription;
detecting, by the chip, whether the chip host device does or does not read the currently active subscription;
detecting, by the chip, only if the chip host device reads the currently active subscription, whether at least one configuration parameter does or does not allow accessing an Internet type network; and
ascertaining, by the chip, only if at least one configuration parameter does not allow accessing an Internet type network, that at least one configuration parameter is corrupted.

2. Method according to claim 1, wherein, to detect that at least one configuration parameter does not allow accessing an Internet type network, the chip sends to the chip host device a first message including a request for establishing a connection to an Internet type network by using the at least one stored configuration parameter and the chip host device sends to the chip a second message including a connection establishment failure.

3. Method according to claim 2, wherein the first message includes an OPEN CHANNEL related Default (network) Bearer type command.

4. Method according to claim 2, wherein the second message includes at least one element of a group comprising:
a terminal response type command; and
an error status type word.

5. Method according to claim 1, wherein the at least one configuration parameter includes at least one Access Point Name.

6. Method according to claim 1, wherein the method further comprises the following steps:
the chip gets, from the chip host device, at least one identifier relating to the chip host device;
the chip sends, through the chip host device, to a server a third message including a request for restoring at least one configuration parameter relating to at least the identified chip host device accompanied with the at least one identifier relating to the chip host device;
the server sends to the chip host device a fourth message including a request for establishing a connection to an Internet type network accompanied with at least one configuration parameter relating to at least the identified chip host device;
the chip host device sends to a connected network gateway a fifth message including a request for establishing a connection to an Internet type network accompanied with the at least one received configuration parameter.

7. Method according to claim 6, wherein the third message further includes either a subscription relating to a home network or the currently active subscription.

8. A chip for detecting a corruption of at least one configuration parameter relating to a chip host device in a roaming scenario,
wherein, the chip being likely to be embedded within or coupled to the chip host device, the chip host device comprising means for storing at least one configuration parameter for configuring an access to an Internet type network, the chip comprising means for storing a first subscription and at least one second subscription, the chip is configured to:

de-activate the first subscription;

activate the second subscription, the second subscription being distinct from the first subscription, as a previously active subscription, the second subscription being a currently active subscription;

detect whether the chip host device does or does not read the currently active subscription;

detect, only if the chip host device reads the currently active subscription, whether at least one configuration parameter does or does not allow accessing an Internet type network; and ascertain, only if at least one configuration parameter does not allow accessing an Internet type network, that at least one configuration parameter is corrupted.

9. Chip according to claim 8, wherein the chip is either incorporated within the chip host device, such as an embedded Universal Integrated Circuit Card, or included within a secure element, such as a Subscriber Identity Module type card.

10. A system for detecting a corruption of at least one configuration parameter relating to a chip host device in a roaming scenario, wherein, the system comprising the chip host device and a chip, the chip being embedded within or coupled to the chip host device, the chip host device storing at least one configuration parameter for configuring an access to an Internet type network, the chip storing a first subscription and at least one second subscription, the chip is configured to:

de-activate the first subscription;

activate the second subscription, the second subscription being distinct from the first subscription, as a previously active subscription, the second subscription being a currently active subscription;

detect whether the chip host device does or does not read the currently active subscription;

detect, only if the chip host device reads the currently active subscription, whether at least one configuration parameter does or does not allow accessing an Internet type network; and ascertain, only if at least one configuration parameter does not allow accessing an Internet type network, that at least one configuration parameter is corrupted.

\* \* \* \* \*